May 4, 1943. T. G. MYERS 2,318,181
SUBMERSIBLE STRUCTURE
Filed Nov. 8, 1937 3 Sheets-Sheet 1
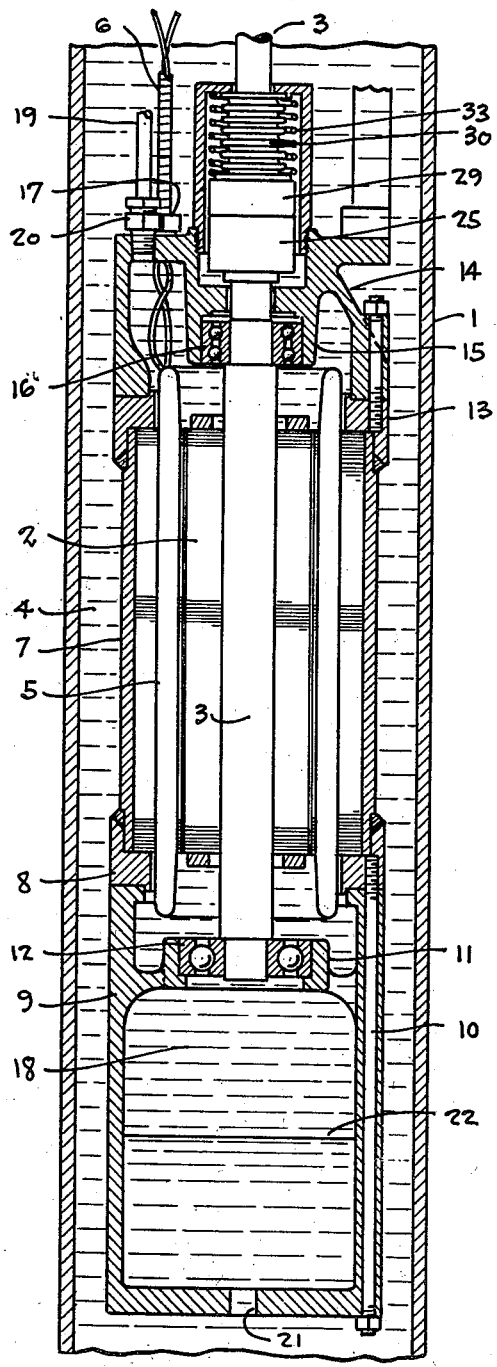
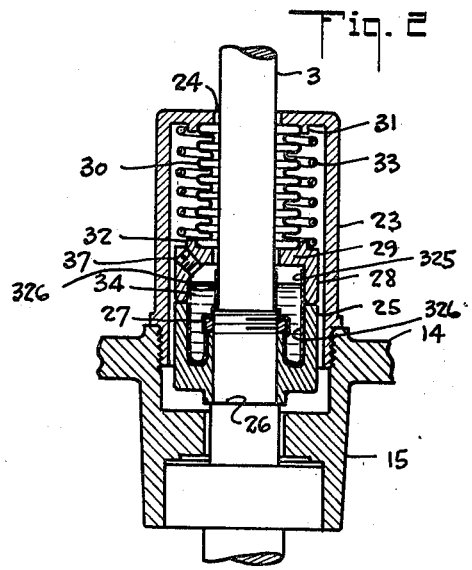
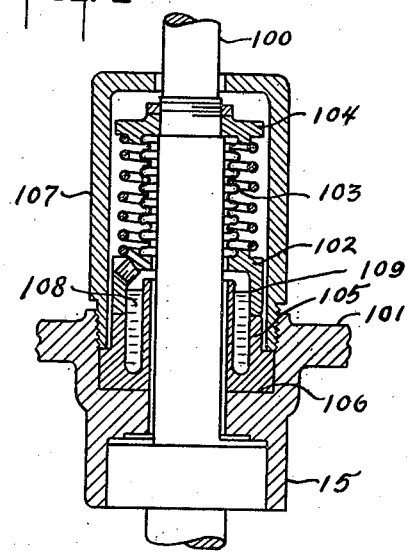
INVENTOR
Thomas G. Myers
BY *John Flann*
ATTORNEY

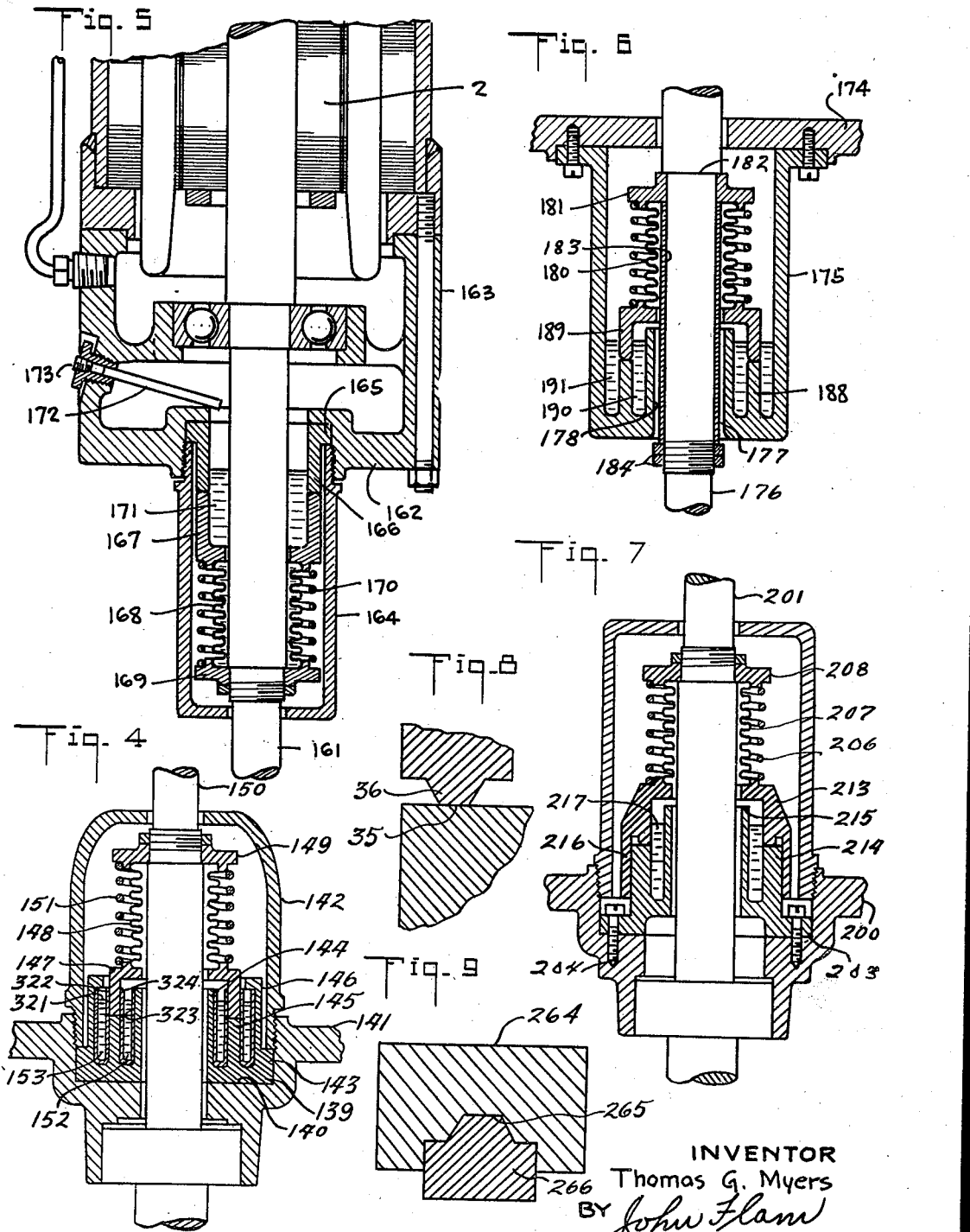

May 4, 1943.　　　T. G. MYERS　　　2,318,181
SUBMERSIBLE STRUCTURE
Filed Nov. 8, 1937　　　3 Sheets-Sheet 3
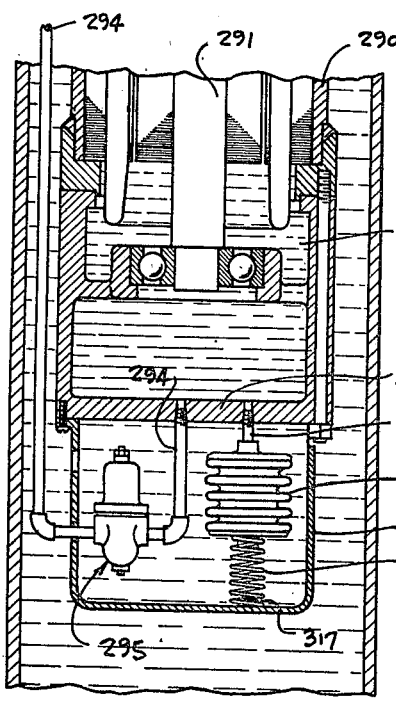
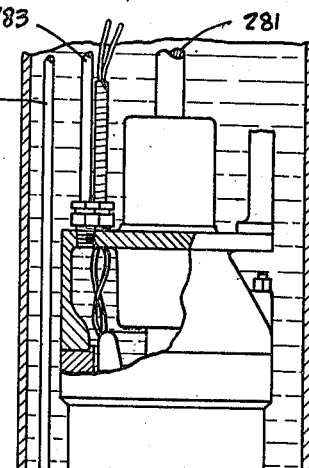
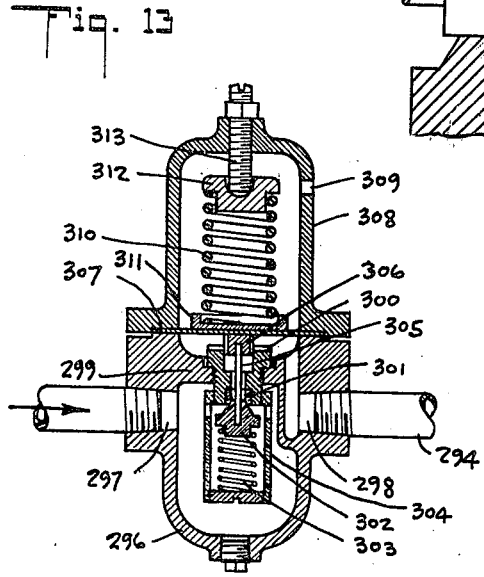
INVENTOR
Thomas G. Myers
BY John Flam
ATTORNEY Patented May 4, 1943

2,318,181

UNITED STATES PATENT OFFICE 2,318,181

SUBMERSIBLE STRUCTURE

Thomas G. Myers, Los Angeles, Calif., assignor to U. S. Electrical Motors, Inc., Los Angeles, Calif., a corporation of California Application November 8, 1937, Serial No. 173,434

4 Claims. (Cl. 286—11)

This invention relates to submersible structures, such as submersible electric motors adapted to be lowered in a well for driving a pump directly connected to the motor.

Usually the material pumped from the well is of such character as to be harmful to the motor should it enter into the motor casing. For example, when water is pumped, it should be kept away from the windings and contacting parts, so as not to cause electrical circuits to be improperly established, that would disable the motor. Also, such liquids usually carry grit, sand or other foreign matter that would quickly ruin the bearings inside of the motor. Accordingly it is of considerable importance to segregate the casing interior as completely as possible from the liquid in which it is submerged.

It is one of the objects of this invention to make it possible in a simple and effective manner to ensure against entry of the external liquid to the operating parts of the motor.

It has been proposed in the past to provide rotary seals of various kinds to effect this result, the seals being disposed around the shaft that necessarily must extend out of the motor casing. However, since the motor casing is subjected to varying liquid pressure, dependent upon the depth at which it is submerged, these ordinary seals have been found quite inadequate. It is another object of this invention to provide a double seal effect to ensure to a greater degree against failure of the seal.

It is another object of this invention to utilize the rotating contact surface type of seal to supplement the mercury seal.

It is still another object of this invention to provide a combination liquid seal, such as mercury, and a seal formed by contact between a pair of relatively rotatable members, the mercury overlapping the region of contact.

It is still another object of this invention to improve in general, seals embodying such relatively rotatable members.

This invention possesses many other advantages, and has other objects which may be made more easily apparent from a consideration of several embodiments of the invention. For this purpose there are shown a few forms in the drawings accompanying and forming part of the present specification. These forms will now be described in detail, illustrating the general principles of the invention; but it is to be understood that this detailed description is not to be taken in a limiting sense, since the scope of the invention is best defined by the appended claims.

Referring to the drawings:

Figure 1 is a view, mainly in longitudinal section, of a structure embodying the invention, shown as submerged in a well;

Fig. 2 is an enlarged fragmentary sectional view of the structure shown in Fig. 1, and particularly showing the construction of the seal for the submersible structure;

Figs. 3, 4 and 7 are views similar to Fig. 2, but illustrating further modifications of the seal;

Fig. 5 is a fragmentary sectional view of the lower portion of a submersible structure in which the rotating shaft extends downwardly from the casing;

Fig. 6 is a fragmentary longitudinal sectional view illustrating a modification of the structure shown in Fig. 5;

Fig. 8 is a fragmentary sectional view still further enlarged, illustrating the configuration of the sealing surfaces utilized in connection with some of the modifications shown in the preceding figures;

Figs. 9 and 10 are diagrammatic views illustrating the manner in which the sealing surface of Fig. 8 may be constructed in order to insure a more perfect seal;

Fig. 11 is an elevation, partly in section, of a slightly modified form of the structure disclosed in Fig. 1;

Fig. 12 is a fragmentary sectional view, of another modification of the structure shown in Fig. 1; and Fig. 13 is a sectional view on an enlarged scale of the pressure regulating valve used with the structure of Fig. 12.

The general character of the submersible structure is illustrated to best advantage in Fig. 1. In this figure there is shown a well casing 1. Within the well there is shown the submersible electrical motor 2, which provides at its upper extremity a driving shaft 3 adapted to be connected, for example, to a pump, not shown, for pumping liquid from the well. The electrical motor 2 is shown as submerged within the liquid 4, which in most instances is water.

The electrical motor 2 is most conveniently of the induction motor squirrel cage type, having primary or stator windings 5. These windings are adapted to be connected, as by the aid of cable 6, to a suitable source of electrical power at the top of the well.

Since the liquid 4 carries foreign particles or dirt, the bearings supporting shaft 3 must be guarded against entry of this liquid. Furthermore, the windings of the motor 2 must also be kept separate from this liquid, for otherwise it would quickly disable the motor.

In order to secure these results, a casing structure is provided which is so arranged that the liquid 4 is excluded from the parts that need to be protected, for all conditions of operation as regards well pressure, level of the liquid, etc. In this instance, this casing structure is shown as formed by a cylindrical body 7 within which the motor stator laminations may be supported. Securely attached to the lower end of the body 7, as by welding, there is an end collar 8. To this in turn is fastened a bearing supporting housing 9. For example, the bearing housing support 9 may be attached to the collar 8 as by a series of threaded studs 10. In this instance the housing 9 provides a stationary collar 11 for supporting the outer race of a ball thrust bearing structure 12. The inner race of this structure 12 is shown as directly supported upon the shaft 3. Upon this shaft 3 are attached the rotor laminations, as is well understood. Since the body 7 may be made from standard pipe, it is a simple matter to provide the correct length of the body required for the rating of the particular motor involved.

At the upper end of the body 7 there is located a collar 13 permanently secured, as by welding, to the top of the body 7. Similarly attached to the collar 13 is an upper bearing housing member 14. The manner of attaching this upper housing member 14 to the collar 13 may be by studs, such as 10, threading into tapped apertures in the top of the collar 13.

The housing 14 provides an axial, inwardly extending boss 15. This boss serves as an appropriate support for the outer race of a radial ball bearing structure 16. The inner race of this ball bearing structure may be directly supported upon the shaft 3.

The shaft 3 extends upwardly through the boss 15 for direct connection to a pump. It is apparent that precautions must be taken to prevent entry of the liquid 4 around the rotating shaft 3 where it extends from the casing structure. The manner in which this is accomplished will be shortly described.

The cable 6 extends through a coupling member 17 in fluid tight connection with the top of the housing 14, leading the connections from the winding 5 upwardly out of the casing structure.

It is preferred to have an inert, lubricating liquid filling within the casing structure. For this purpose lubricating oil is convenient, although other liquids that may be suitable could be used. This liquid filling is indicated by reference character 18 below the thrust bearing structure 12. The casing structure may be replenished with liquid, as required. For example, a supply pipe 19 can be connected to the top of the bearing housing 14, as by the aid of the pipe connection 20. This pipe 19 may lead to the top of the well for appropriate connection to a source of the liquid under suitable pressure.

It is advantageous that the liquid pressure inside of the casing structure be closely controlled. In this way there is an assurance that the sealing means provided for the shaft 3 will not be subjected to an undue pressure differential. In the present instance, equality of pressure is secured by extending the housing 9 downwardly and leaving an opening 21 therein for the ingress of the water. The filling of liquid 18 is such that the surface of contact 22 between it and the water is always considerably below the lower bearing structure 12. Since both the liquid and the water are substantially incompressible, this level 22 is maintained substantially constant, irrespective of the depth to which the submersible motor is lowered.

Should it ever be desired to change the liquid filling while the motor is submerged, it is possible to urge liquid downwardly under pressure through pipe 19. The new liquid coming in will express the old liquid outwardly through the aperture 21, and the casing will be maintained full with the freshly supplied liquid.

It may be desirable to have the pressure within the motor casing different from that existing outside of it. Thus in the form of structure shown in Fig. 11, a casing 280 is provided which may be similar to casing of Fig. 1 and supports the motor stator and rotor in the same way. The motor shaft 281 extends upwardly out of the casing for connection to a pump as before, and is provided with any appropriate seal, such as disclosed herein, to prevent entry of well liquid to the casing. The casing is closed at its lower end with a domed head 282, and no provision is made to permit entry of well liquid to balance the internal and external pressures. Liquid for filling the casing is supplied through a pipe 283 extending from the top of the well, and a return pipe 284 extends from the bottom of the casing to the top of the well. By means of these pipes and suitable apparatus at the top of the well, liquid may be supplied to the casing or circulated through it, the pressure being kept at a suitable value.

In Figure 12 a form of structure is disclosed in which means are provided to maintain the pressure within the casing at a predetermined amount above that prevailing outside of it. This is often desirable, since any leakage that occurs will then be outward from the casing, insuring against entry of the well fluid. The casing 290 in this form is again similar to the structure of Fig. 1, appropriate sealing means being provided where the shaft 291 passes through the top of the casing. The lower end of the casing is provided with a head 292 which excludes the well fluid.

The liquid 293 in the casing is supplied under pressure and in regulated amount through a conduit 294, having its upper end at the top of the well. The automatic pressure control is effected by a pressure regulator 295, interposed in this conduit, and which is shown in greater detail in Fig. 13.

Frame 296 of regulator 295 has an inlet 297 and an outlet 298, on opposite sides of a dividing wall 299. This wall supports a member 300, as by screw threads, forming a valve seat 301. A valve closure 302 cooperates with the valve seat and is urged to closing position, as by the spring 303 held in cage 304. There are, however, additional opposing forces acting to open the valve, which forces act to insure the pressure of well liquid outside of casing 290 at approximately the level of the casing, plus an added pressure, exists inside the motor casing 290.

Thus closure 302 is fastened to a stem 305 extending through member 300. At its upper end, stem 305 is fastened to a guide 306 joined to a diaphragm 307. This diaphragm can be metal or leather or the like, and can be held in place by a cover member 308 apertured as at 309 to permit the well pressure to be exerted on the upper surface of the diaphragm. Supplementing this external pressure of the well liquid is the pressure of a compression spring 310. This spring has a guide or shoe 311 resting on the diaphragm 307, and its upper end rests against a support 312. The pressure of the spring is adjustable by the aid of a set screw 313 in cover 308, to provide an adjustment of the total pressure on diaphragm 307. The lower surface of diaphragm 307 is exposed to the opposing pressure in casing 290 via conduit 294.

It is apparent that the diaphragm 307 urges the valve to open when the pressure acting on its upper surface exceeds the pressure of the liquid in the casing 290, acting on the lower side of the diaphragm 307. Thus as the casing 290 is lowered into the well, the liquid 293 is forced under pressure into the casing until closure 302 is urged to closing position against its seat. If the pressure in casing 290 is reduced to an undesirable value, the closure 302 is depressed, because of the reduction in pressure on the lower side of the diaphragm, and additional lubricant is supplied until the pressure becomes enough greater than the well pressure to maintain the casing 290 clear of the entry of any foreign matter.

The liquid 293 expands and contracts in accordance with temperature variations. To permit this, without the attainment of excessive pressures, a "Sylphon" 314 is provided, in communication with casing 290, as by nipple 315. The liquid therefore, is permitted to expand and contract and correspondingly expand and contract Sylphon 314. Spring 316 acts on the Sylphon, tending to compress it, and rests on a stationary support 317 located in a cover 318. By appropriate design of the spring 316 and Sylphon 314, the arrangement is such that variation in the volume of the oil has no material effect upon the automatic pressure regulation.

The shaft 3, shown most clearly in Fig. 2, passes upwardly through a clearance aperture 24 located in the top flange of the tubular casing extension 23. This tubular extension 23 is joined to the casing structure as by being threaded into the top of the bearing housing structure 14. The water from the well, of course, may enter around the shaft 3 through the clearance aperture 24. However, it is prevented from entering through the boss 15, by the provision of a sealing structure now to be described. This sealing structure involves in general the provision of a pair of annular sealing surfaces arranged to be placed in contact with each other, one of which is non-rotary and supported by the submersible casing, and the other rotary and supported by the shaft 3. This surface seal is enhanced by the aid of a supplemental liquid seal, such as mercury or carbon tetrachloride, thus providing a double sealing effect.

For example, in the form shown in Figs. 1 and 2, the shaft 3 carries a cup 25. This cup is urged against a shoulder 26 on shaft 3, as by the aid of the nut 27 threaded on the shaft 3 and maintaining the cup 25 in liquid tight connection with the shaft 3. The upper edge of cup 25 is shown as being in contact with the lower edge of flange 28 which is formed upon a non-rotary collar 29. This collar 29 is supported by the tubular member 23 in such a way as to permit vertical movement while maintaining the annular surface around shaft 3 separate from the interior of the tubular member 23. For example, this may be accomplished by the aid of a metal bellows 30. This metal bellows is joined in fluid tight manner at its top to the short depending flange 31 extending from the top of the tubular housing 23. The lower end of the metal bellows 30 is similarly permanently secured to the flange 32, shown as integral with the collar 29. A compression spring 33 is in contact at its upper end with the lower surface of the top flange of tubular member 23. The lower end of compression spring 33 rests upon the collar 29 to urge the collar and the flange 28 downwardly against the outer edge of the cup 25.

The liquid 4 from the well may enter into the space within the bellows 30 and into the cup 25. It would, however, be prevented from entry into the casing structure by the annular seal provided between the relatively rotating parts 25 and 28. In some instances this seal might be sufficient; however, in the present instance this sealing effect is enhanced or fortified by the use of a heavy liquid filling 34 within the cup 25 and overlapping the surface of contact between members 25 and 28. Preferably this heavy liquid 34 is of the kind which has a high surface tension, such as mercury. Carbon tetrachloride may also be used.

The area of contact between members 25 and 28 may be of the form illustrated in Fig. 8. For example, this area of contact may take the form of a rather narrow annular band 35 (Fig. 8), provided by forming one of the two relatively rotating parts with an annular rib or projection 36. By providing a narrow annulus of this character, unevenness of the surfaces of contact would not materially affect the quality of the seal, especially after the mechanism has been in operation for a period and has worn in.

In Fig. 2 the space between cup 25 and flange 28 may be in communication with an outlet 37 for filling this space with the appropriate heavy liquid as required. This filling aperture may be closed by an appropriate plug as indicated.

The characteristics of the seal shown in Fig. 2 may be summarized as follows: the use of a rotary and non-rotary member having annular sealing surfaces in contact; the use of a "Sylphon" or metal bellows to make it possible to urge one surface against the other while maintaining segregation of liquid from one side to the other of the seal; the use of the pressure inside the chamber containing the inert liquid to create a force holding the sealing surfaces together; and the use of a supplemental heavy liquid overlapping the area of contact to augment and supplement the sealing effect of the relatively rotatable annular surfaces. In the form shown in Fig. 2 the heavy liquid or mercury 34 is shown as disposed within a rotary cup 25. In this way, some centrifugal action is imparted to the liquid 34, causing it to pack rather tightly against the sealing members.

By appropriate choice of areas of the rotary and non-rotary sealing members, which are exposed to the liquid pressures existing within and without the casing, it is possible to cause a preponderance of pressure urging the members together to sealing position; and if desired, this pressure urging the members together may be increased by increasing the pressure within the casing over that existing outside the casing.

The use of the "Sylphon" or flexible member between the stationary member and the contact surface, prevents vibration in this part from being transmitted to the junction of the sealing surface which would tend to break the seal. This flexible member also allows the sealing surfaces to follow inaccuracies in the contacting members and misalignment of the shaft 3 and other inaccuracy tending to open the sealing surface. However, it is possible to use several other modifications as far as the disposal of the liquid seal is concerned.

Another form of the invention is illustrated in Fig. 3. In this case the shaft 100, which extends upwardly out of the casing 101, carries the rotary sealing member 102. This sealing member 102 is supported on the bottom of the metal bellows 103, the top of which is supported on the collar 104 fastened to the shaft 100. The sealing surface of the member 102 is in contact with the annular upper edge of a non-rotary cup 105. This cup in this instance is supported on the shoulder 106 formed around the top of the bearing boss 15. It is held in fluid tight manner against the shoulder 106 by the bottom edge of the tubular housing extension 107. The supplemental liquid seal 108 is disposed in the annular space formed between members 105 and 102 on the one hand, and the inner annular flange 109 on the other hand. As before, the heavy liquid seal 108, which may be mercury, overlaps the area of contact between the rotary and non-rotary sealing members.

In this instance the top of the mercury seal 108 is in contact with the liquid filling in the casing 101. The water in the well enters into the annular space between the extension 107 and the metal bellows 103.

In the form of the invention illustrated in Fig. 4, a stationary cup 139 is provided, supported on the shoulder 140 of the casing 141. It is held against the shoulder 140, as by the aid of the tubular extension 142, threading down on to the annular flange 143 disposed around the exterior portion of the cup 139.

This cup 139 is provided with an inner annular member 144 and intermediate annular member 145 and exterior annular member 146. The intermediate annular member 145 in this instance provides the sealing surface cooperating with the rotative member 147. This rotative member 147 is supported on the bottom of the metal bellows 148. The upper end of the bellows 148 is fastened in fluid tight manner to a collar 149 fastened in any appropriate manner to the shaft 150. Compression spring 151 urges the rotary member 147 into contact with the intermediate flange 145.

In this case, two liquid seals are provided. One seal 152 is disposed within the intermediate annular flange 145 and has its surface in contact with the oil filling the casing 141. The other liquid seal 153 extends around the intermediate flange 145. Both liquid seals 152 and 153 may, as before, be formed of mercury and overlap the relatively movable contacting and sealing surfaces. The surface of liquid seal 153 is in contact with the liquid 4 which enters into the extension 142.

It is not essential, in order to utilize the seals corresponding to this invention in a casing, that the shaft extend upwardly out of the casing. In the forms of the invention illustrated in Figs. 5 and 6 the shafts are shown as extending downwardly from the fluid tight casing.

Thus in the form of Fig. 5 the motor 2 is shown as having a shaft 161 extending downwardly through the bottom flange 162 of the bearing housing member 163. A downwardly extending tubular extension 164 is provided surrounding the shaft 161. Supported on the shoulder 165 surrounding shaft 161, is an annular non-rotative sealing member 166. It is held in place by the upper end surface of the threaded end of tubular extension 164.

Contacting with the lower edge of the non-rotative member 167 is the upper edge of a rotative cup member 167. This cup member is supported by the metal bellows 168, the lower end of which is supported on the collar 169 fastened to a shaft 161. Compression spring 170 urges the two sealing members 166 and 167 together.

In this case also a heavy liquid seal 171, such as mercury, overlaps the areas of contact between the sealing members. It is disposed inside of the cup 167 and fills the intervening space between the metallic bellows 168 and the shaft 161.

In order to make it possible to replenish the liquid seal 171, a feeding tube 172 is shown as supportd in the wall of the housing 163 and leading downwardly into the space formed between the stationary member 166 and the shaft 161. This tube may be closed fluid tight, as by the aid of a taper threaded plug 173.

In the form of the invention illustrated in Fig. 6, the casing 174 is shown as having a tubular extension 175 fastened to the bottom thereof. Through this extension extends the shaft 176. This shaft 176 passes through the clearance aperture 177 formed in the bottom of member 175. An inner annular flange 178 forms a non-rotary cup. In this instance the cup is formed with an intermediate flange 188, the upper edge of which is intended to be in sealing contact with the rotary sealing member 189 carried on a Sylphon or metal bellows 180 fastened at its upper end to the rotary collar 181 attached to shaft 176. In the present instance the collar 181 is shown as urged against the shoulder 182 on shaft 176, as by the aid of a sleeve 183 urged upwardly, as by the nuts 184 threaded to the shaft 176.

Thus there are two liquid seals, one inside and one outside of the intermediate annular flange 188; an inner liquid seal 190 in contact with the exterior liquir of the well, and an exterior liquid seal 191 in contact with the filling of the casing 174. Both liquid seals, of course, as before, overlap the areas of contact.

It may be desirable in some instances to provide a structure that will more fully insure proper alignment between the sealing surfaces.

One such construction is illustrated in Fig. 7. In this form a shaft 201 extends upwardly out of a fluid tight casing 200. A non-rotary annular member 214 is fastened within a recess 203 in the top wall of the casing 200, as by the aid of the screws 204. This annular member 214 is formed as the outer edge of an annular cup having an inner flange 215. The rotary sealing member 213 is urged downwardly into sealing contact with member 214, as by the aid of the compression spring 206. The metal bellows 207, as before, serves to segregate the spaces on either side of the sealing members. This metal bellows is fastened at its bottom to the rotary member 213 and at the top to the cap 208 fastened to the shaft 201.

Under certain load conditions, transverse flexure of shaft 201 is possible. This flexure may disturb accuracy of contact between the rotary and non-rotary members 213 and 214. In order to guard against such an occurrence, a telescoping guide is provided, such as a tubular extension 216 attached to the rotary member 213 and guided on the exterior surface of the non-rotary member 214. This telescopic member 216 is in sliding relation with the member 214 and provides a supplemental seal between the members 213 and 214. A heavy liquid seal 217 is disposed within the flange 214 and overlaps the sealing surfaces. It is apparent that the surface of the liquid seal is in contact with the filling of casing 200.

It is further to be noted that even if shaft 201 flexes transversely of its axis, this flexure is permitted by the flexibility of the metal bellows 207, without in any way disturbing the proper alignment between the sealing surfaces. Furthermore, the machining of the parts telescoping together facilitates the assembly of the contacting seal surfaces. It also makes possible checking of the accuracy thereof prior to installation of the motor casing, and eliminates the necessity of extremely accurate machining of other parts.

In general, it is advisable to insure as perfect smoothness of the contacting sealing surfaces as practicable; otherwise, it may be necessary to wear in the sealing surfaces. Such wearing in may require the necessity of dragging off minute pieces of metal, which may adversely affect the seal.

In order to obviate this, the sealing surfaces are preferably compressed smooth, as by the aid of a die or by the aid of a hard metal roll. In this connection attention is invited to Figs. 9 and 10. In Fig. 9 the die 264, made from hard metal and carefully polished in its annular recess 265, is used for forming the sealing member 266. By providing sufficient pressure, the smoothness of the sealing surface thus provided may be very materially improved.

Alternately, as shown in Fig. 10, the sealing surface 267 may be rolled smooth, as by the hard metal roller 268.

The character of the contacting surfaces in connection with all of the seals illustrated in these various modifications may be given some consideration. In some instances one of the two relatively rotary members may be made from a metal which forms a mercury amalgam, such as copper. The liquid seal being in the form of a body of mercury, reacts with the metal and forms an amalgam that acts somewhat as an oil film. The effect of providing the amalgam at the contacting surfaces is to smooth out any inequalities thereof.

Also in some instances the character of the materials in contact between the rotary and non-rotary sealing members may be purposely chosen for durability and smoothness, and capability of retaining the required high degree of smoothness for extended periods of operation. As examples of the character of these contacting surfaces, may be mentioned bronze or steel, hardened as by carburizing. The steel may be hardened, in addition, as by nitriding it. Another form of seal may be formed by nitrided steel on nitrided steel. These nitrided steels have extreme hardness and withstand wear remarkably well.

As a substitute for the nitrided steel, chromium plated surfaces may be used for one of the sealing surfaces. The other sealing surface may also be chromium plated steel, or bronze, or even nitrided steel. The important feature is that at least one of the two surfaces is provided with a comparatively hard wearing layer formed as by nitriding, hardening, carburizing or plating. The character of these surfaces discussed applies to all of the forms of the invention illustrated in the drawings.

From a consideration of the description of the various forms of the invention, it is seen that they include the contact of liquid with relatively rotating parts. The liquid may be mercury, oil, water, carbon tetrachloride, or their equivalents. It has been found that the liquids in contact may tend to emulsify and to affect the seal deleteriously. Also, such liquids as mercury tend to combine chemically with the relatively rotating sealing surfaces. For example, bronze or steel rotating in mercury may combine to form a black powder.

In order to obviate these occurrences, the various surfaces in contact with the liquids utilized in the seal may be protected as by a ceramic enamel, or by baked enamel. The enamel reduces the frictional loss, emulsion is retarded, and since the enamel is inert, chemical action is prevented.

Such a construction may be applied to all of the forms heretofore described.

The layers are also indicated specifically in Figs. 2, and 4. In Fig. 2 the layers 325, 326 are thus intended to overlap the region of contact between the liquids. In Fig. 4 both bodies of the liquid seal 152, 153 may be isolated by the layers 321, 322, and 323, 324.

What is claimed is:

1. In a submersible structure, a casing, a rotary shaft extending from the casing, an annular non-rotary cup, having an outer wall and an inner wall, surrounding the shaft, a rotary member having an annular surface in contact with the outer wall of the cup, a metal bellows carried by the shaft and supporting said rotary member, and a liquid seal in the cup, overlapping the contacting areas.

2. In a submersible structure, a casing, a rotary shaft extending from the casing, a non-rotary annular cup supported by the casing, said cup having an inner and an outer annular edge, surrounding the shaft, a rotary member having an annular surface in contact with the inner annular edge, and carried by the shaft, and a liquid seal in the cup between the inner and outer edges, and overlapping the area of contact.

3. In a submersible structure, a casing, a rotary shaft extending from the casing, a non-rotary annular cup surrounding the shaft, said cup having an inner and an outer annular edge as well as an intermediate flange forming an intermediate annular edge, a rotary member having an annular surface in contact with the intermediate annular edge and carried by the shaft, and liquid seals in the cup on respectively opposite sides of said intermediate flange and overlapping the area of contact.

4. In a submersible structure, a casing, a rotary shaft extending downwardly from the casing, a non-rotary annular cup supported below the casing and having an inner annular flange and an intermediate annular flange, a rotary member carried by the shaft and having an annular area in contact with the intermediate annular flange, and liquid seals on respectively opposite sides of said intermediate flange and overlapping the area of contact.

THOMAS G. MYERS.